United States Patent
Bae et al.

(10) Patent No.: US 10,866,637 B2
(45) Date of Patent: Dec. 15, 2020

(54) GESTURE CLASSIFICATION APPARATUS AND METHOD USING EMG SIGNAL

(71) Applicants: SAMSUNG ELECTRONICS CO., LTD., Suwon-si (KR); Korea Advanced Institute of Science and Technology, Daejeon (KR)

(72) Inventors: Chisung Bae, Yongin-si (KR); Jin Woo Shin, Daejeon (KR); Kwi Hyuk Jin, Daejeon (KR); Ui Kun Kwon, Hwaseong-si (KR)

(73) Assignees: SAMSUNG ELECTRONICS CO. LTD., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1062 days.

(21) Appl. No.: 15/264,999

(22) Filed: Sep. 14, 2016

(65) Prior Publication Data
US 2017/0220923 A1 Aug. 3, 2017

(30) Foreign Application Priority Data

Feb. 2, 2016 (KR) .................. 10-2016-0012914

(51) Int. Cl.
*G06F 3/01* (2006.01)
*G06N 3/08* (2006.01)
(Continued)

(52) U.S. Cl.
CPC .............. *G06F 3/015* (2013.01); *G06F 1/163* (2013.01); *G06F 3/017* (2013.01);
(Continued)

(58) Field of Classification Search
None
See application file for complete search history.

(56) References Cited

U.S. PATENT DOCUMENTS 8,437,844 B2   5/2013 Syed Momen et al.
8,447,704 B2 * 5/2013 Tan ..................... G06F 3/015
                                                706/12
(Continued)

FOREIGN PATENT DOCUMENTS

JP         4078419 B2    4/2008
KR     10-0994408 B1    11/2010
(Continued)

OTHER PUBLICATIONS

Ahsan, Md Rezwanul, Muhammad Ibn Ibrahimy, and Othman O. Khalifa. "Electromygraphy (EMG) signal based hand gesture recognition using artificial neural network (ANN)." 2011 4th International Conference on Mechatronics (ICOM). IEEE, 2011. (Year: 2011).*

(Continued)

*Primary Examiner* — Daniel T Pellett
(74) *Attorney, Agent, or Firm* — NSIP Law

(57) ABSTRACT

A gesture classification apparatus and method is disclosed. The apparatus may include a feature extractor configured to extract a plurality of features using a electromyogram (EMG) data group obtained from an EMG signal sensor including a plurality of channels, an artificial neural network including an input layer to which the EMG data group corresponding to the plurality of features is input and an output layer configured to output a preset gesture corresponding to the plurality of features, and a gesture recognizer configured to recognize a gesture performed by a user and corresponding to the extracted features.

18 Claims, 11 Drawing Sheets

(51) Int. Cl.
  *G06K 9/62* (2006.01)
  *G06K 9/00* (2006.01)
  *G06F 1/16* (2006.01)
  *G04G 21/08* (2010.01)

(52) U.S. Cl.
  CPC ..... *G06K 9/00355* (2013.01); *G06K 9/00536* (2013.01); *G06K 9/6273* (2013.01); *G06N 3/08* (2013.01); *G04G 21/08* (2013.01)

(56) References Cited

U.S. PATENT DOCUMENTS

| | | |
|---|---|---|
| 2009/0327171 A1 | 12/2009 | Tan et al. |
| 2012/0209134 A1 | 8/2012 | Morita et al. |
| 2012/0310370 A1 | 12/2012 | Huang et al. |
| 2013/0117207 A1 | 5/2013 | Kim et al. |
| 2014/0031952 A1 | 1/2014 | Harshbarger et al. |
| 2015/0109202 A1* | 4/2015 | Ataee ............ G06F 3/017 345/156 |
| 2015/0169074 A1* | 6/2015 | Ataee ............ G06F 3/017 345/156 |

FOREIGN PATENT DOCUMENTS

| | | |
|---|---|---|
| KR | 10-1152841 B1 | 7/2012 |
| KR | 10-1251081 B1 | 4/2013 |
| KR | 10-1413853 B1 | 7/2014 |

OTHER PUBLICATIONS

Jung, Kyung Kwon, et al. "EMG pattern classification using spectral estimation and neural network." SICE Annual Conference 2007. IEEE, 2007. (Year: 2007).*

Oskoei, Mohammadreza Asghari, and Huosheng Hu. "GA-based feature subset selection for myoelectric classification." 2006 IEEE International Conference on Robotics and Biomimetics. IEEE, 2006. (Year: 2006).*

Manimegalai, E. H. S. D. "Hand gesture recognition based on EMG signals using ANN." Int J Comput Appl 3.2 (2013): 31-9. (Year: 2013).*

Stathakis, D. "How many hidden layers and nodes?." International Journal of Remote Sensing 30.8 (2009): 2133-2147. (Year: 2009).*

Huang, Guang-Bin. "Learning capability and storage capacity of two-hidden-layer feedforward networks." IEEE Transactions on Neural Networks 14.2 (2003): 274-281. (Year: 2003).*

Del Boca, Adrian, and Dong C. Park. "Myoelectric signal recognition using fuzzy clustering and artificial neural networks in real time." Proceedings of 1994 IEEE International Conference on Neural Networks (ICNN'94). vol. 5. IEEE, 1994. (Year: 1994).*

Rojas-Martinez, Monica, Miguel A. Mañanas, and Joan F. Alonso. "High-density surface EMG maps from upper-arm and forearm muscles." Journal of neuroengineering and rehabilitation 9.1 (2012): 1-17. (Year: 2012).*

Chen, Xun, and Z. Jane Wang. "Pattern recognition of number gestures based on a wireless surface EMG system." Biomedical Signal Processing and Control 8.2 (2013): 184-192. (Year: 2013).*

Robinson, Mark A., Jos Vanrenterghem, and Todd C. Pataky. "Statistical Parametric Mapping (SPM) for alpha-based statistical analyses of multi-muscle EMG time-series." Journal of Electromyography and Kinesiology 25.1 (2015): 14-19. (Year: 2015).*

Kleine, Bert-Ulrich, et al. "Surface EMG mapping of the human trapezius muscle: the topography of monopolar and bipolar surface EMG amplitude and spectrum parameters at varied forces and in fatigue." Clinical neurophysiology 111.4 (2000): 686-693. (Year: 2000).*

* cited by examiner

GESTURE CLASSIFICATION APPARATUS AND METHOD USING EMG SIGNAL

CROSS-REFERENCE TO RELATED APPLICATION(S)

This application claims the benefit under 35 USC 119(a) of Korean Patent Application No. 10-2016-0012914 filed on Feb. 2, 2016, in the Korean Intellectual Property Office, the entire disclosure of which is incorporated herein by reference for all purposes.

BACKGROUND

1. Field

The following description relates to technology for classifying a feature of a gesture based on an electromyogram (EMG) signal using a neural network.

2. Description of Related Art

A variety of wearable devices provided in a wearable form such as, for example, glasses, a watch, and a garment have been widely commercialized. A user may interact with and obtain desired information from a wearable device that includes a sensor to measure biosignals such as a brainwave and an electromyogram (EMG) signal from the user.

Wearable devices are embedded with electronics, software, sensors and connectivity technologies to enable external interaction with a user's environment by exchanging data with other devices. However, a user is still limited in ways of controlling a wearable device using a finger of the user irrespective of a location on which the wearable device is worn. Thus, there is a desire for a more convenient method of controlling the wearable device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a gesture classification apparatus includes an electromyogram (EMG) signal sensor including a plurality of channels, the EMG signal sensor outputting an EMG data group, and at least one processor. The processor including instructions for executing a feature extractor, an artificial neural network, and a gesture recognizer. The feature extractor is configured to extract a plurality of features using the EMG data group. The artificial neural network includes an input layer to which the EMG data group corresponding to the plurality of features is input, and an output layer configured to output a preset gesture corresponding to the plurality of features. The gesture recognizer is configured to recognize a gesture performed by a user and corresponding to the extracted features using the artificial neural network.

The gesture classification apparatus may further include a preprocessor configured to remove noise from data obtained from the EMG signal sensor and perform normalization on the data.

The preprocessor may additionally remove a minimum or floor value of each channel from data obtained from each channel.

The preprocessor may extract an EMG data group based on a location of a channel having a maximum value among the plurality of channels.

The feature extractor may extract a preset number of features by generating an EMG data map of a dimension corresponding to the number of the channels and calculating a performance based on a ratio between a within-cluster variance of each gesture and a between-cluster variance associated with another gesture.

The artificial neural network may include a first hidden layer disposed between the input layer and the output layer, and the first hidden layer may be fully mapped to the input layer in the EMG data group.

The artificial neural network may include a second hidden layer disposed between the first hidden layer and the output layer. The number of nodes included in the second hidden layer may be greater than the number of nodes included in the output layer, and may be less than the number of nodes included in the first hidden layer.

The artificial neural network may be trained through general learning based on an EMG data group obtained from the EMG signal sensor sensing gestures performed by a plurality of users, and may be trained through adaptive learning based on an EMG data group obtained from the EMG signal sensor sensing the gesture performed by the user.

The plurality of features may be extracted by moving, on a time axis, a preset-sized window of an EMG signal output from the EMG signal sensor.

In another general aspect, a gesture classification method includes obtaining an EMG data group from a plurality of channels, extracting a plurality of features using the EMG data group, and recognizing, using an artificial neural network, a gesture performed by a user and corresponding to the extracted features.

The extracting of the plurality of features may include generating an EMG data map of a dimension corresponding to the number of the channels, calculating a performance based on a ratio between a within-cluster variance of each gesture and a between-cluster variance associated with another gesture, and extracting a preset number of features based on the calculated performance.

The artificial neural network may include an input layer to which the EMG data group corresponding to the plurality of features is input, and an output layer configured to output a preset gesture corresponding to the plurality of features.

The artificial neural network may include a first hidden layer disposed between the input layer and the output layer, and the first hidden layer may be fully connected to the input layer in the EMG data group.

The artificial neural network may include a second hidden layer disposed between the first hidden layer and the output layer, and the number of nodes included in the second hidden layer may be greater than the number of nodes included in the output layer and may be less than the number of nodes included in the first hidden layer.

The artificial neural network may be trained through general learning based on an EMG data group obtained from an EMG signal sensor sensing gestures performed by a plurality of users, and may be trained through adaptive learning based on an EMG data group obtained from the EMG signal sensor sensing a gesture performed by a corresponding user.

In still another general aspect, a wearable device includes a sensor configured to obtain an input EMG signal from a body portion of a user being in contact with the sensor through a plurality of channels, and a processor configured to extract a plurality of features by moving, on a time axis, a preset-sized window of the input EMG signal, recognize a gesture performed by a user and corresponding to the plurality of features using an artificial neural network, and perform a command corresponding to the recognized gesture.

The processor may adjust, based on a user feature using the input EMG signal obtained from the user, reference EMG signals of a plurality of users that are pre-trained through the artificial neural network.

The artificial neural network may include an input layer to which an EMG data group corresponding to the plurality of features is input, and an output layer configured to output a preset gesture corresponding to the plurality of features.

In another general aspect, a wearable device includes a sensor and a processor. The sensor is configured to measure bioelectrical signal from a user's body. The processor includes instructions for executing a features extractor, an artificial neural network, and a gesture recognizer. The features extractor is configured to extract features from a portion of the bioelectrical signal. The artificial neural network includes an input layer mapped to the features, and an output layer configured to output a preset gesture corresponding to the features. The gesture recognizer is configured to determine a gesture performed by the user based on the plurality of features of the output layer. The gesture recognizer is configured to recognize a gesture based on prior knowledge of the plurality of features of the output layer.

The sensor may include channels mapped to the input layer, and a hidden layer mapped to the input layer and the output layer.

Each of the channels may be spaced apart each from the other. The bioelectric signal may be filtered to remove noise after being measured. The portion of the bioelectrical signal may be determined through a windowing function.

Other features and aspects will be apparent from the following detailed description, the drawings, and the claims.

Figure 1:
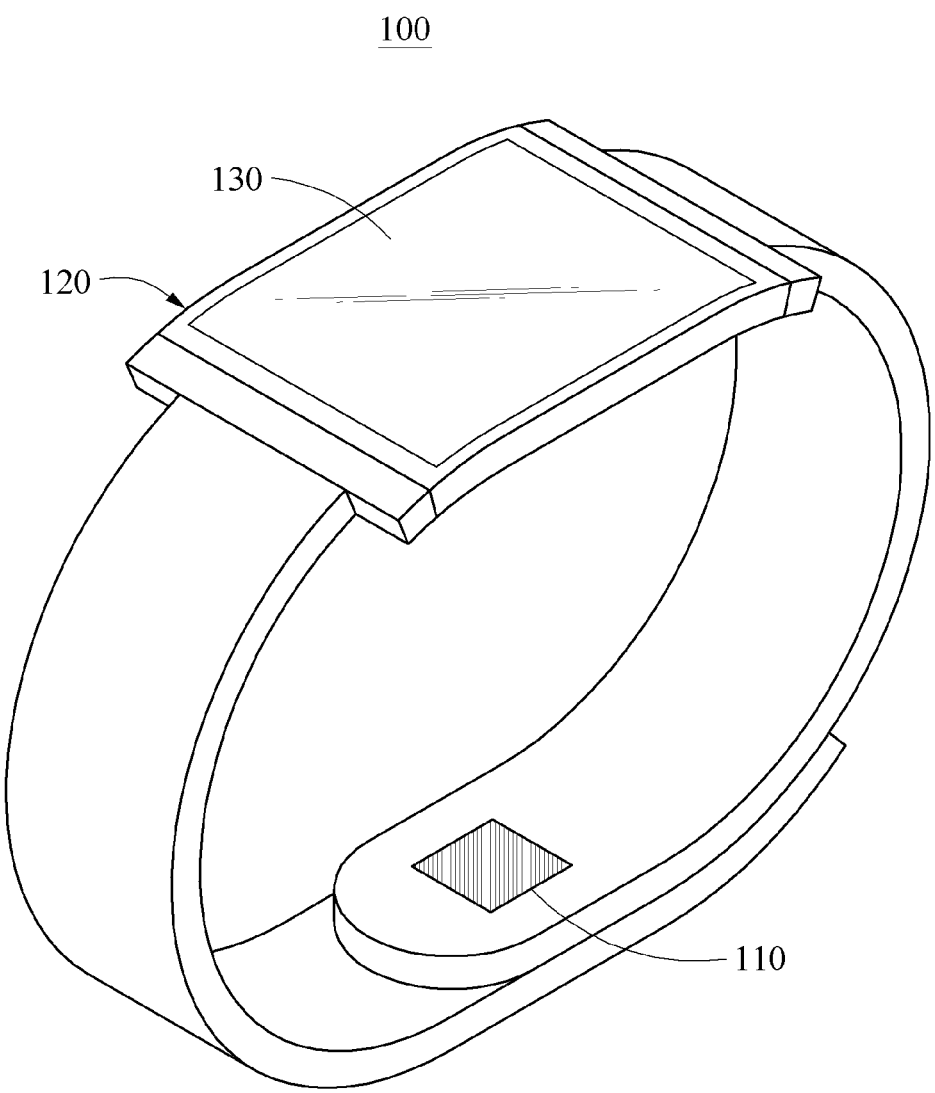
FIG. 1 is a diagram illustrating an example of a wearable device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this disclosure, specify the presence of stated features, integers, steps, operations, elements, components, and/or combinations thereof, but do not preclude the presence or addition of one or more other features, numbers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s).

It should be noted that if it is described in the disclosure that one component is "connected," "coupled," or "joined" to another component, a third component may be "connected," "coupled," and "joined" between the first and second components, although the first component may be directly connected, coupled or joined to the second component.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Examples to be described hereinafter may be used to recognize a gesture performed by a user using an electromyogram (EMG), electrocardiogram (ECG), electroencephalogram (EEG), electrooculography (EOG), galvanic skin response (GSR), or magnetoencephalogram (MEG) signal of the user. The examples may be embodied in a form of a wearable device including a sensor configured to obtain a biosignal, e.g. an EMG signal, from a body portion of a user and a display configured to output a result of recognizing a gesture performed by the user.

Hereinafter, examples are described in detail with reference to the accompanying drawings. When describing the examples with reference to the accompanying drawings, like reference numerals refer to like constituent elements and a repeated description related thereto will be omitted.

FIG. 1 is a diagram illustrating an example of a wearable device 100.

Referring to FIG. 1, the wearable device 100 includes a sensor 110, a processor 120, and an image display 130. Although a watch-type wearable device is illustrated as an example of the wearable device 100 in FIG. 1, the wearable device 100 may be provided in all types or forms that may be attached or worn on by a user.

The sensor 110 obtains an input EMG signal from a body portion of a user being in contact with the sensor 110 through a plurality of channels.

Figure 2:
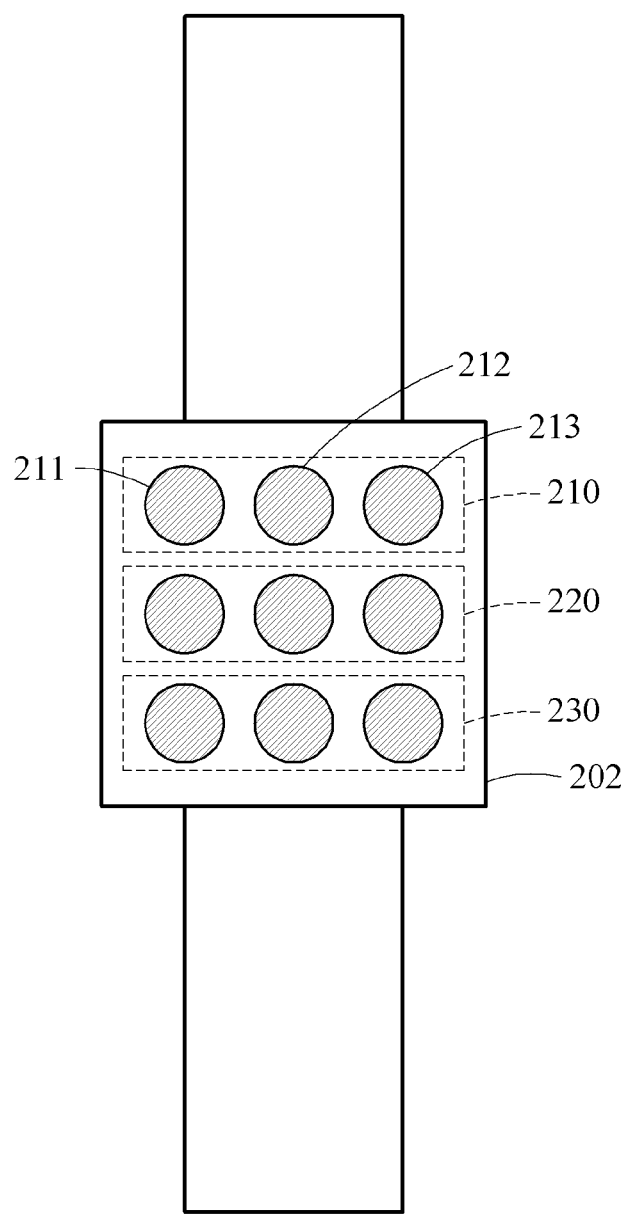
FIG. 2 is a diagram illustrating an example of a sensor of a wearable device.

A detailed description of an example of the sensor 110 will be provided with reference to FIG. 2.

The processor 120 determines and responds to a command corresponding to a gesture performed by the user by learning the input EMG signal through an artificial neural network and recognizing the gesture based on a result of the learning.

The processor 120 adjusts reference EMG signals of a plurality of users that are pre-learned through the artificial neural network based on a user feature using the input EMG signal obtained from the user.

The artificial neural network includes an input layer to which an EMG data group corresponding to a plurality of features is input, and an output layer configured to output a preset gesture corresponding to the plurality of features.

The processor 120 performs a wavelet transform on an obtained EMG signal. The wavelet transform uses a frequency conversion method that is most suitable for an EMG signal.

The processor 120 reconstructs the EMG signal obtained through the conversion. The reconstruction refers to a process of obtaining a time-domain EMG signal based on data obtained through the frequency conversion.

The processor 120 extracts mathematical features from the preprocessed EMG signal. Here, among the extracted features, a feature having a high value after measurement performed based on a performance measurement standard may be selected.

The processor 120 classifies the gesture by applying a machine learning algorithm based on the plurality of features finally obtained from the EMG signal. A detailed description of the machine learning algorithm will be provided with reference to FIG. 8.

The image display 130 displays a result of the learning through the artificial neural network or the command corresponding to the gesture recognized through the artificial neural network.

FIG. 2 is a diagram illustrating an example of a sensor 202 of a wearable device 200.

Referring to FIG. 2, the wearable device 200 includes a sensor 202 including a a first channel 210, a channel 220, and a third channel 230. In an example, the sensor 202 may be provided on a back side of a display (not shown) of the wearable device 200 that is disposed on a watch. In another example, the sensor may be provided in a wrist strap of the wearable device 200.

Although the sensor 202 includes three channels in the example of FIG. 2, the sensor may include at least two channels. Each of the channels 210, 220, 230 include an anode 211, a cathode 212, and a ground 213. However, the channels may only include a subset from the anode 211, the cathode 212, and the ground 213. For example, the ground 213 may be a common ground signal shared by the channels.

Thus, the wearable device 200 may obtain the number of EMG data groups as many as the number of channels from a single gesture.

Figure 3:
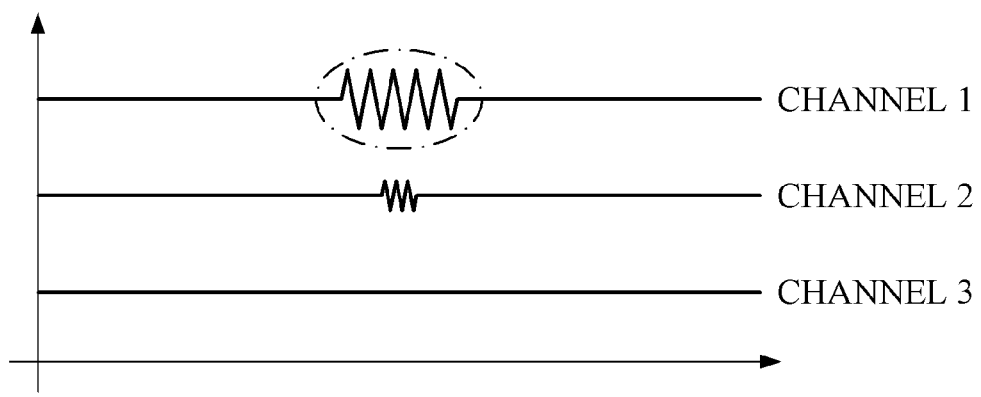
FIG. 3 is a diagram illustrating an example of an electromyogram (EMG) signal sensed through a plurality of channels.

FIG. 3 is a diagram illustrating an example of an EMG signal sensed through a plurality of channels.

Referring to FIG. 3, an EMG signal is sensed through a plurality of channels. At the channel 1, strength of the EMG signal is the greatest, and at the channel 2, the strength of the EMG signal is less than channel 1. At the channel 3, the strength of the EMG signal is non-existent because the EMG is not discovered.

Figure 4:
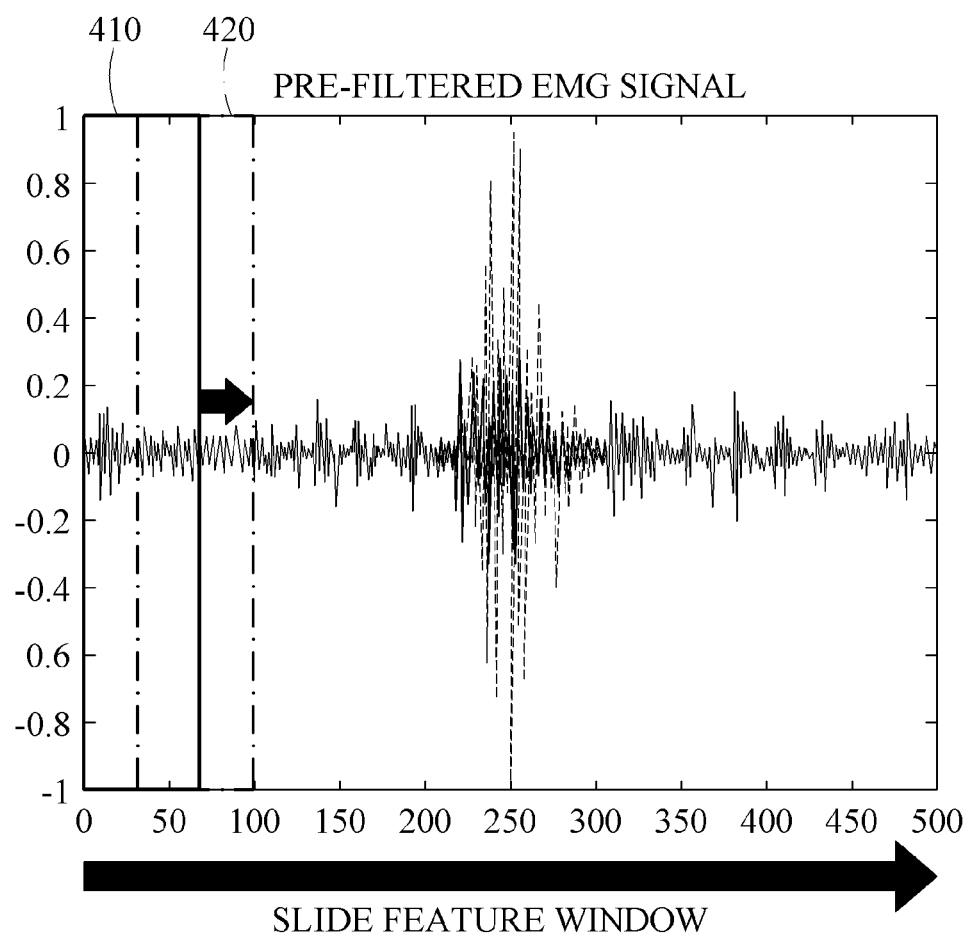
FIG. 4 is a diagram illustrating an example of preprocessing performed on a plurality of EMG data groups.

FIG. 4 is a diagram illustrating an example of a process of extracting a feature from EMG data using a window.

EMG data may be obtained through an EMG sensor to verify a point in time at which a gesture occurs. Here, entire data may not be used, and only EMG data in a portion in which a feature appears may be extracted and used. Referring to FIG. 4, a portion in which a feature appears is extracted by sliding a small-sized feature window 410 aside on a time axis. A small-sized feature window 420 shows a state of the small-sized feature window 410 being slid aside on a time axis.

A gesture classification apparatus may extract a feature value by isolating a portion of the sensed EMG data. Isolating a portion will enable easier extraction of a plurality of feature values for a single feature from a single set of EMG data. Here, a feature value may include a moving average, a root mean square error (RMSE), an amplitude, a zero crossing, and/or a change in derivatives.

For example, the gesture classification apparatus may obtain an EMG signal generated each time a user performs a gesture using an attached sensor. A wearable device may preprocess the obtained EMG signal by removing noise from the EMG signal and performing normalization based on a maximum value of the EMG signal. A discrete wavelet transform and reconstruction may be performed on the normalized or refined signal obtained through the preprocessing in order to obtain EMG data from various views.

The gesture classification apparatus may not use all the extracted feature values and may only use feature values based on a preset standard, which allows for a more exact gesture classification of feature values of an EMG signal.

Figure 5:
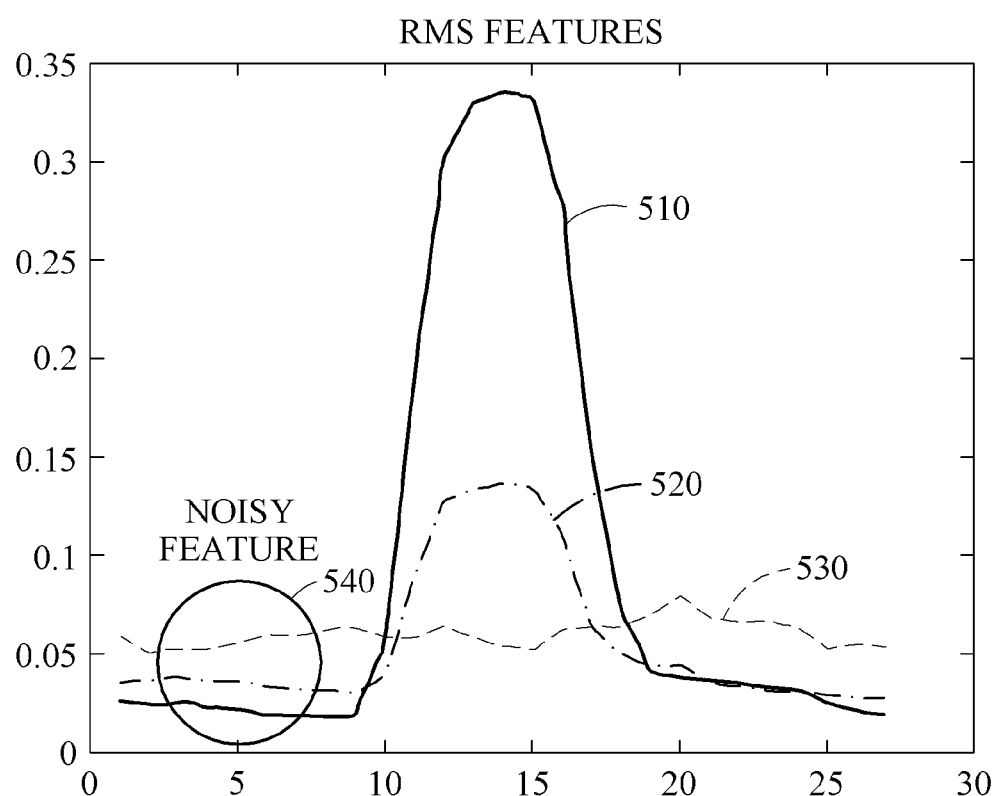
FIG. 5 is a diagram illustrating an example of a process for removing noise from a plurality of EMG data groups.

FIG. 5 is a diagram illustrating an example of a process of removing noise from a plurality of EMG data groups.

Referring to FIG. 5, a first EMG data 510 is obtained from a first channel, a second EMG data 520 is obtained from a second channel, and a third EMG data 530 is obtained from a third channel. Although three channels are illustrated in the example of FIG. 5, the number of channels is not limited to the example and fewer or more number of channels may exist.

A gesture classification apparatus may determine a minimum value 540 obtained from each channel to additionally remove noise from each set of the EMG data 510, 520, and 530. Subsequently, the gesture classification apparatus may additionally remove the noise from the EMG data 510, 520, and 530 by subtracting each minimum value 540 of each channel. Noise may also be removed from the EMG data 510, 520, and 530 using a filter such as a band-pass, pass-band, low-pass, and/or high-pass filter.

Figure 6:
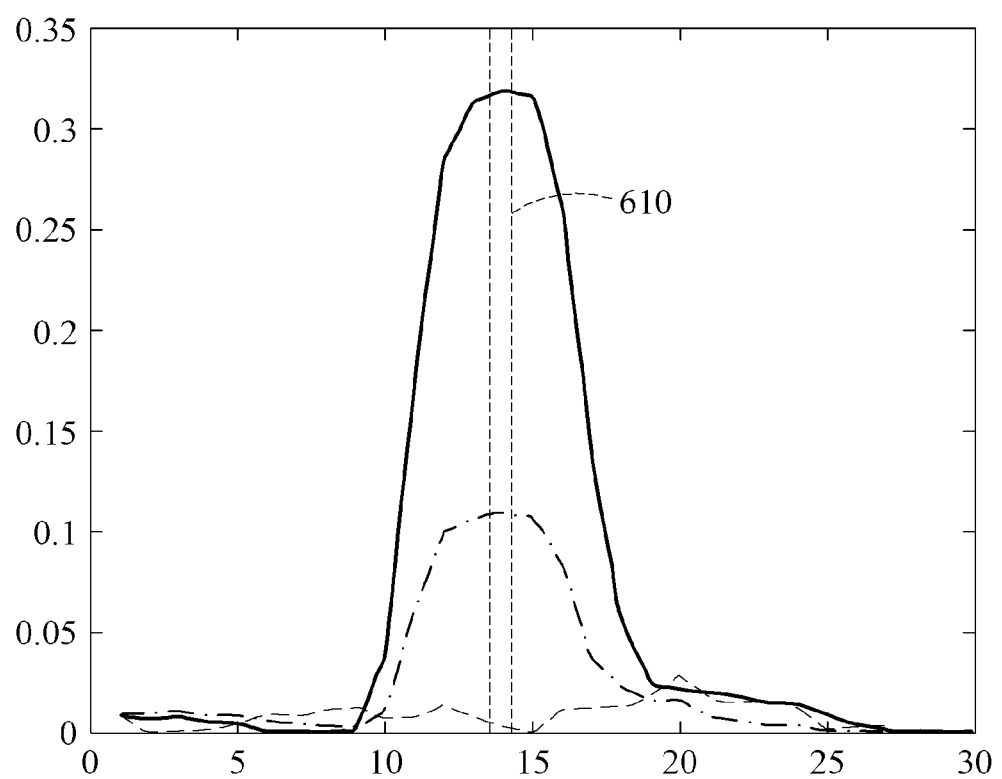
FIG. 6 is a diagram illustrating an example of a process for extracting a feature point from a plurality of EMG data groups.

FIG. 6 is a diagram illustrating an example of a process of extracting a feature from a plurality of EMG data groups.

Referring to FIG. 6, an EMG data group is extracted based on a portion 610 having a highest value in the EMG data group including three sets of EMG data. Although respective values of EMG data obtained from a second channel and a third channel are relatively low, a gesture classification apparatus determines that the EMG data as a whole correlates with a preset gesture, and extracts corresponding EMG data in portion 610 as the single EMG data group. The portion 610 having the highest value in the EMG data group may also be determined based on known frequencies of gesture signals.

Figure 7A:
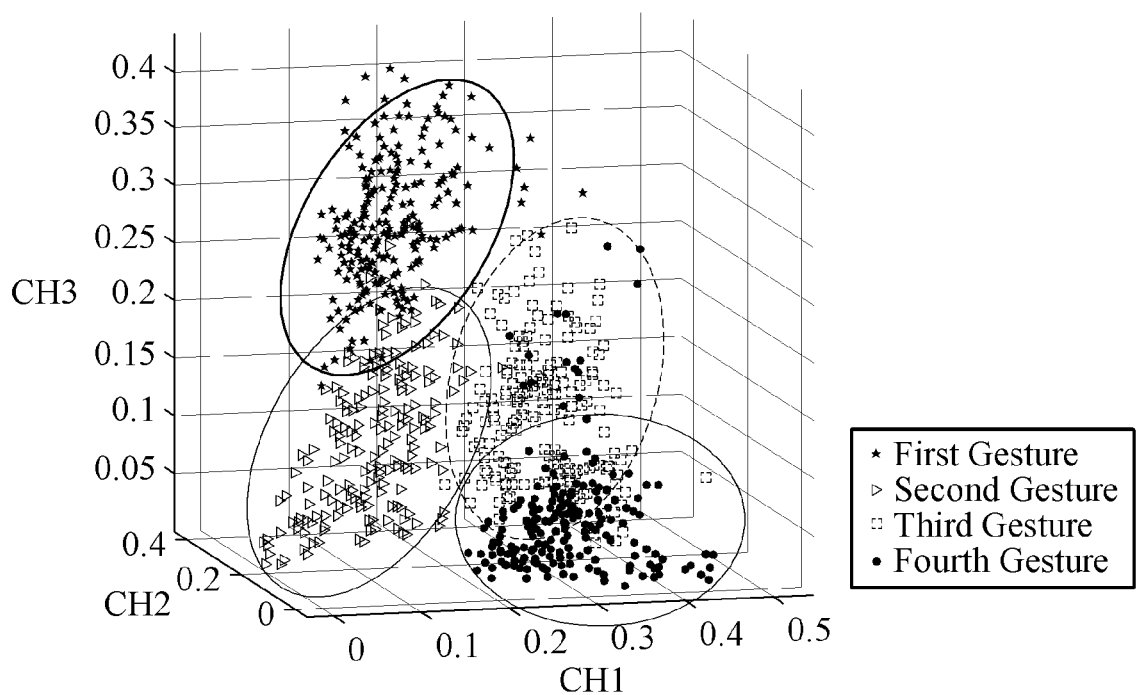
FIGS. 7A and 7B are diagrams illustrating examples of an EMG data map.
Figure 7B:
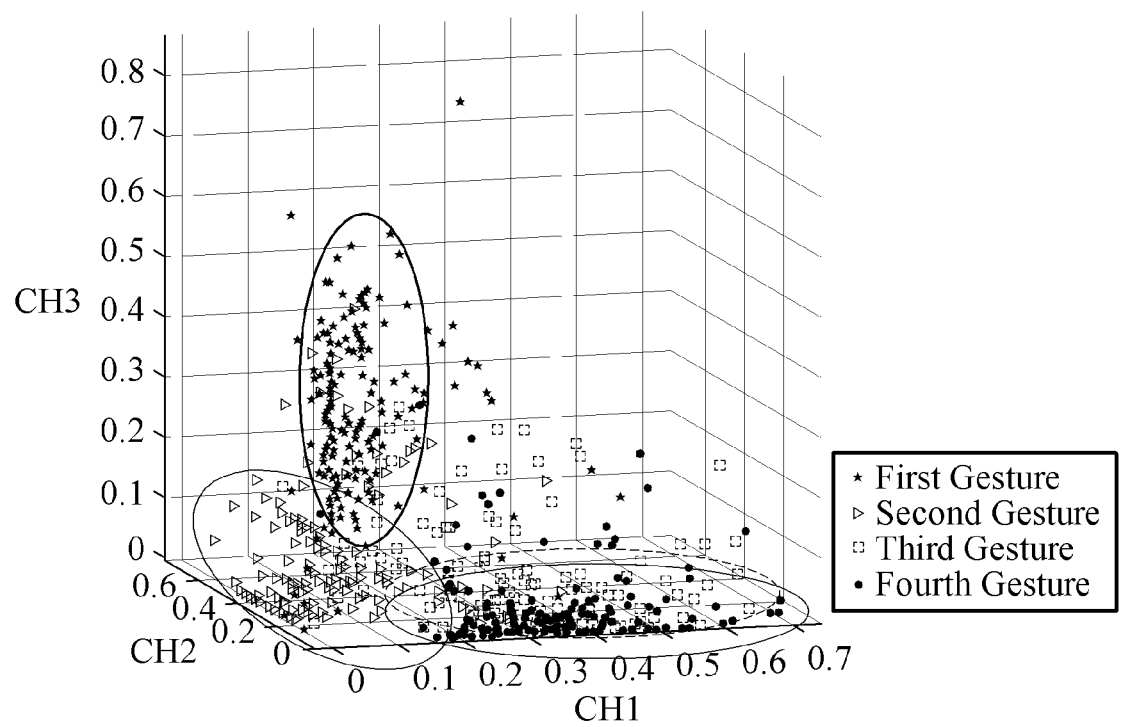

FIGS. 7A and 7B are diagrams illustrating examples of an EMG data map.

FIGS. 7A and 7B illustrate an EMG data map of a dimension corresponding to the number of channels. The examples of FIGS. 7A and 7B are EMG data maps indicating a distribution of features for each gesture. Referring to FIGS. 7A and 7B, values of a same shape indicate a same gesture. There are four gestures depicted, namely: first gesture, second gesture, third gesture, and fourth gesture. Referring to FIG. 7A, first gesture, second gesture, third gesture, and fourth gesture can be easily classified or grouped because they each cluster around different locations. However, in the example of FIG. 7B, first gesture, second gesture, third gesture, and fourth gesture cannot be easily classified because they do not cluster in distinct locations. Thus, FIG. 7A illustrates a good detection of features, and FIG. 7B illustrates a poor detection features. Using the features detected in the example of FIG. 7A may enable a more accurate classification of a gesture.

In mathematical terms, a gesture classification apparatus may calculate such performance or determination based on a ratio between a within-cluster variance of each gesture and a between-cluster variance associated with another gesture.

In an example, the gesture classification apparatus may select only a preset number of features among features calculated through a performance measuring method using a data cluster without using all values obtained from the features, and use the selected number of features.

Subsequently, selected top "n" features may be used in a classification algorithm, where "n" is a natural number.

Figure 8:
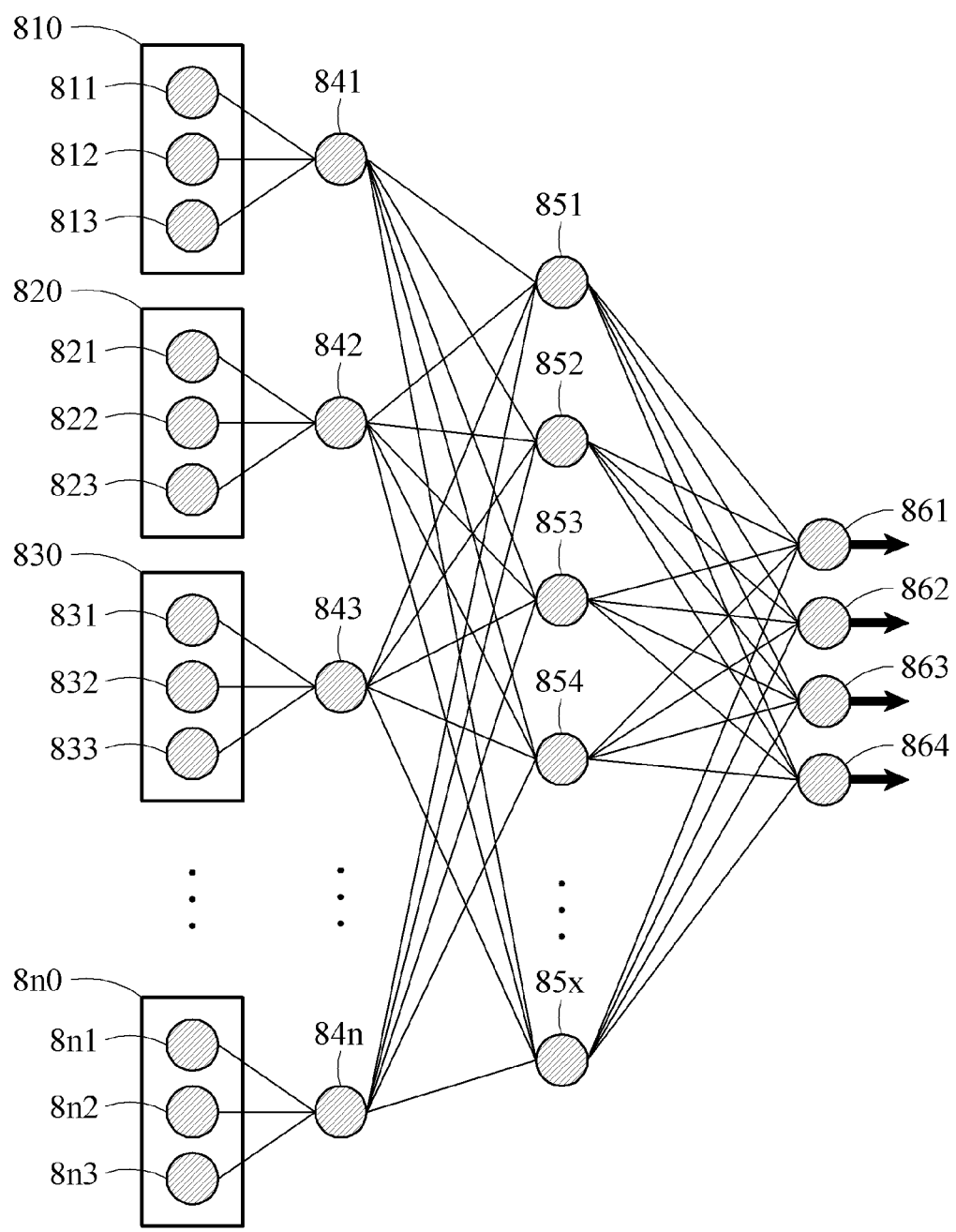
FIG. 8 is a diagram illustrating an example of an artificial neural network.

FIG. 8 is a diagram illustrating an example of an artificial neural network.

Referring to FIG. 8, the artificial neural network includes an input layer to which an EMG data group corresponding to a plurality of features is input and an output layer configured to output a preset gesture corresponding to the plurality of features. The input layer includes, a first input layer 810, a second input layer 820, a third input layer 830 . . . and an nth input layer $8n0$. The output layer includes a first output layer 861, a second output layer 862, a third output layer 863, and a fourth output layer 864.

In an example, in the input layer of the artificial neural network, data of each channel may not independently operate, but operate based on a feature. In the example of FIG. 8, the first input layer 810 corresponds to a first feature that includes three channels, namely: a first channel 811, a second channel 812, and a third channel 813. The artificial neural network includes a first hidden layer disposed between the input layer and the output layer. The first hidden layer includes a first hidden layer 841, a second hidden layer 842, a third hidden layer 843 . . . an nth hidden layer $84n$. Each channel of the first feature is only connected to one of the hidden layers. The first input layer 810, corresponding to the first features, is only connected to the first hidden layer 841.

The second input layer 820, corresponding to a second feature, has three channels, namely: a first channel 821, a second channel 822, and a third channel 823. Each channel of the second input layer 820 is only connected to the second hidden layer 842.

The third input layer 830, corresponding to a third feature, has three channels, namely: a first channel 831, a second channel 832, and a third channel 833. Each channel of the third input layer 830 is only connected to the third hidden layer 843.

Similarly, the nth input layer $8n0$, corresponding to the n-th feature, has three channels, namely: a first channel $8n1$, a second channel $8n2$, and a third channel $8n3$. Each channel of the n-th feature is only connected to the nth hidden layer $84n$.

In an example, gesture classification may be performed by obtaining selective information from each feature by connecting values obtained from each feature to a corresponding hidden layer.

The number of nodes in a local network of the first hidden layer may be set to be small to compress information, or large to expand the information.

Although the number of sensors is illustrated as three channels and each feature includes three sets of EMG data in FIG. 8, the number of channels may be at least two.

For example, when a user performs a preset gesture, a gesture classification apparatus measures an EMG signal through k sensors, and obtain data of k dimensions through a feature extraction process. The gesture classification apparatus may determine that the data of the k dimensions obtained when the preset gesture is performed is correlated and thus, process feature data obtained through all channels by grouping the feature data into one group.

Algorithms used by the gesture classification apparatus may be designed under the assumption that values extracted from a single feature are correlated with one another. When a user performs a gesture, signals as many as the number of sensors, and values as many as the number of sensors may be obtained by extracting a root-mean-square value from k signals. The values obtained from the single feature may have a correlation with one another, and thus, the gesture classification may be more effectively classified by applying such correlation to a machine learning algorithm. Thus, the gesture classification apparatus may obtain a gesture classification improvement from an existing machine learning algorithm.

As illustrated in FIG. 8, the artificial neural network includes a second hidden layer, for example, a first hidden layer 851, a second hidden layer 852, a third hidden layer 853, a fourth hidden layer 854, . . . , an "x" hidden layer $85x$ that is disposed between the first hidden layer and the output layer.

The number, "x," of nodes included in the second hidden layer may be greater than the number of nodes included in the output layer, and less than the number of nodes included in the first hidden layer. In an example performed experimentally, an accurate result is obtained when the total number of features is 13, the number of the nodes in the first hidden layer is 13, and the number of the nodes in the second hidden layer is 7.

The artificial neural network may be a computing device that performs machine learning using input data. For example, the input data may be a biosignal of a user obtained through a wearable or attachable device. The biosignal may be an electrocardiogram (ECG), electroencephalogram (EEG), electrooculography (EOG), galvanic skin response (GSR), or magnetoencephalogram (MEG) signal. The artificial neural network may be included in the gesture classification apparatus. Also, each node indicates an artificial neuron included in the artificial neural network.

The gesture classification apparatus may determine the number of nodes of each independent input layer of the artificial neural network, the number of hidden layers, the number of nodes of the hidden layers, and connections of the nodes. The number of the nodes of the hidden layers connecting the nodes of the input layer and the nodes of the output layer in the artificial neural network may decrease or increase to adapt to the input.

Figure 9:
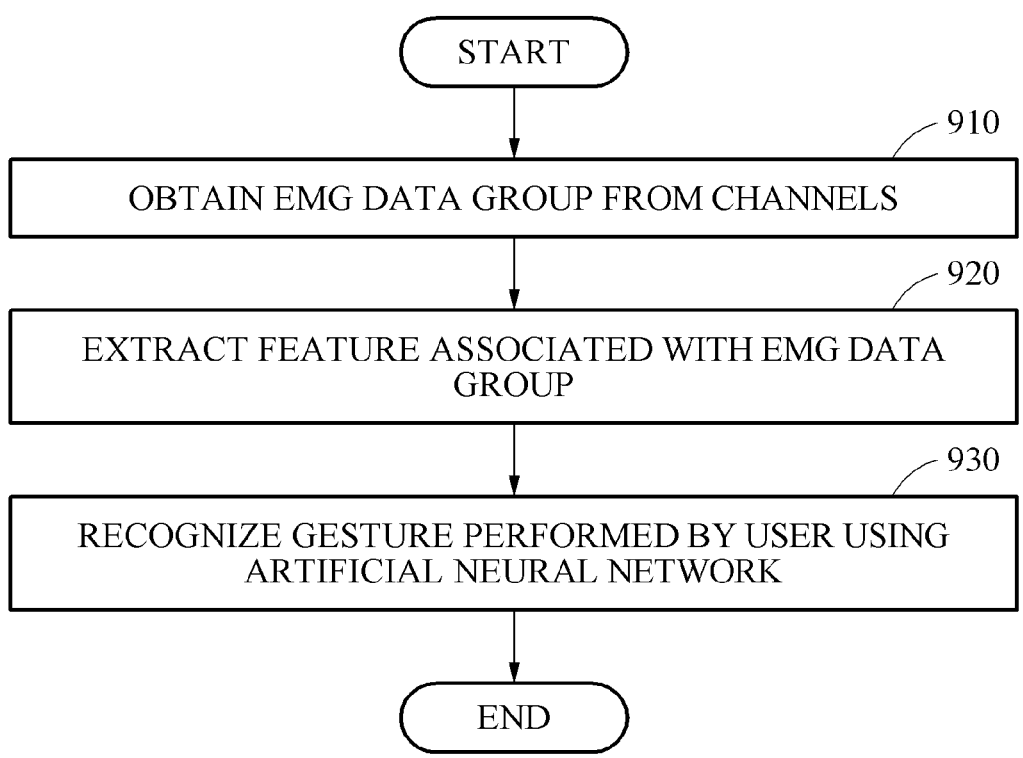
FIG. 9 is a flowchart illustrating an example of a gesture classification method.

FIG. 9 is a flowchart illustrating an example of a gesture classification method. The gesture classification method is performed by a gesture classification apparatus.

Referring to FIG. 9, in operation 910, the gesture classification apparatus obtains an EMG data group from a plurality of channels. The plurality of channels may be the number of channels corresponding to the number of sensors, which means obtaining a single gesture using a plurality of sensors. EMG data obtained through the plurality of channels in response to a single gesture may be grouped into an EMG data group and managed as a single feature instead of being managed for each channel.

For example, the gesture classification apparatus may obtain the EMG data group from an EMG measuring apparatus including three sensors.

The gesture classification apparatus may perform preprocessing on the obtained EMG data group. The gesture classification apparatus may remove noise from the obtained EMG data group, and prevent irregularity by performing normalization.

In operation 920, the gesture classification apparatus extracts a feature associated of the EMG data group.

The extracting operation may include generating an EMG data map of a dimension corresponding to the number of channels, calculating a performance based on a ratio between a within-cluster variance for each gesture and a between-cluster variance associated with another gesture, and extracting a preset number of features based on the calculated performance.

In operation 930, the gesture classification apparatus recognizes, using an artificial neural network, a gesture performed by a user that corresponds to the extracted features.

The artificial neural network may include an input layer to which the EMG data group corresponding to the plurality of features is input, and an output layer configured to output a preset gesture corresponding to the plurality of features.

The artificial neural network may include a first hidden layer disposed between the input layer and the output layer, and the first hidden layer may be fully mapped to the input layer in the EMG data group.

In addition, the artificial neural network may include a second hidden layer disposed between the first hidden layer and the output layer. The number of nodes included in the second hidden layer may be greater than the number of nodes included in the output layer, and less than the number of nodes included in the first hidden layer.

The artificial neural network may be trained through general learning based on an EMG data group obtained from an EMG signal sensor that senses gestures performed by a plurality of users, and trained through adaptive learning based on an EMG data group obtained from the EMG signal sensor that senses a gesture performed by a corresponding user.

Figure 10:
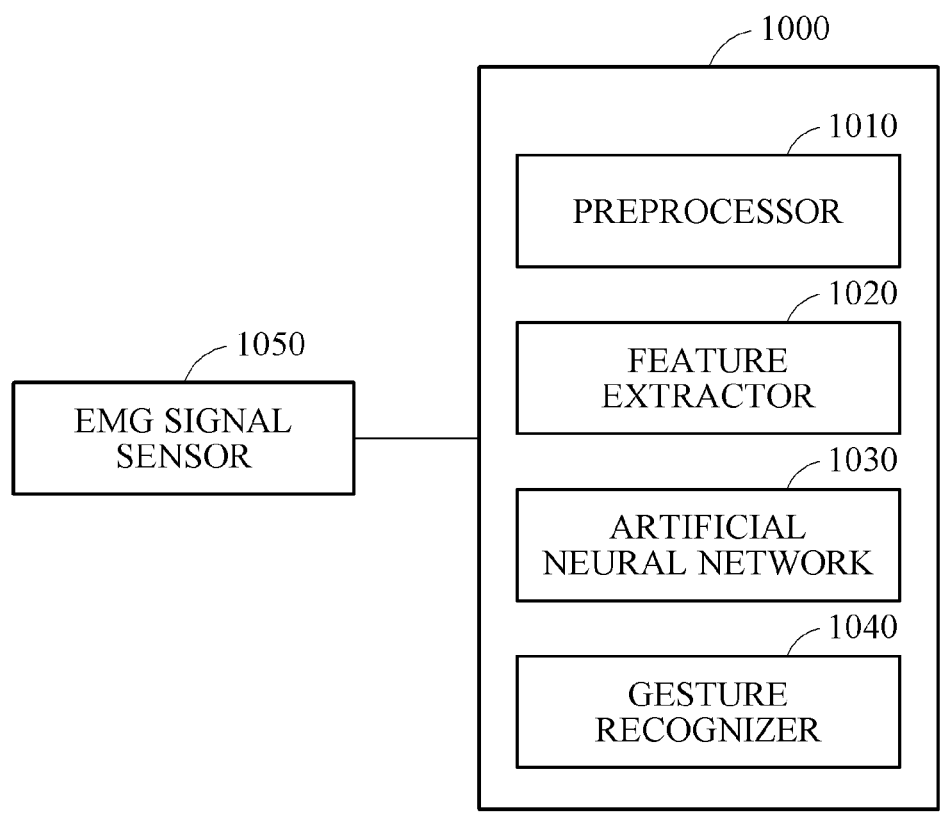
FIG. 10 is a diagram illustrating an example of a gesture classification apparatus.

FIG. 10 is a diagram illustrating an example of a gesture classification apparatus 1000.

Referring to FIG. 10, the gesture classification apparatus 1000 includes a preprocessor 1010, a feature extractor 1020, an artificial neural network 1030, and a gesture recognizer 1040.

The gesture classification apparatus 1000 may receive EMG data from an EMG signal sensor 1050.

The gesture classification apparatus 1000 may be provided in a portable electronic device. The portable electronic device may be embodied as, for example, a laptop computer, a mobile phone, a smartphone, a tablet personal computer (PC), a mobile Internet device (MID), a personal digital assistant (PDA), an enterprise digital assistant (EDA), a handheld console, an e-book, and a smart device. For example, the smart device may be provided as a smart watch or a smart band.

The preprocessor 1010 removes noise from the data obtained from the EMG signal sensor, and perform normalization on the data.

The preprocessor 1010 may additionally remove a minimum value of each channel from data obtained from each channel.

The preprocessor 1010 extracts an EMG data group based on a location of a channel having a greatest value among a plurality of channels.

The feature extractor 1020 extracts a plurality of features using the EMG data group obtained from the EMG signal sensor 1050 including the plurality of channels.

The feature extractor 1020 may extract a preset number of features by generating an EMG data map of a dimension corresponding to the number of channels and calculating a performance based on a ratio between a within-cluster variance for each gesture and a between-cluster variance associated with another gesture.

The artificial neural network 1030 includes an input layer to which the EMG data group corresponding to the plurality of features is input, and an output layer configured to output a preset gesture corresponding to the plurality of features.

The artificial neural network 1030 includes a first hidden layer disposed between the input layer and the output layer. The first hidden layer is mapped to the input layer in the EMG data group.

The gesture recognizer 1040 recognizes a gesture performed by a user using EMG data.

For example, when the user performs a gesture of putting a palm downwards with a hand being fully open, a signal of a first channel and a second channel of the EMG signal sensor 1050 may be intensively received. The gesture recognizer 1040 may determine, using preprocessed EMG data, the gesture performed by the user to be the gesture of putting the palm downwards with the hand being fully open.

In another example, when the user performs a gesture of lifting a thumb, a signal of only the first channel of the EMG signal sensor 1050 may be intensively received. The gesture recognizer 1040 may determine, using preprocessed EMG data, the gesture performed by the user to be the gesture of lifting the thumb.

In another example, when the user performs a gesture of spreading out only a little finger, a signal of only a third channel of the EMG signal sensor 1050 may be intensively received. The gesture recognizer 1040 may determine, using preprocessed EMG data, the gesture performed by the user to be the gesture of spreading out only the little finger.

In another example, when the user performs a gesture of spreading out only an index finger, a signal of only the second channel of the EMG signal sensor 1050 may be intensively received. The gesture recognizer 1040 may determine, using preprocessed EMG data, the gesture performed by the user to be the gesture of spreading out only the index finger.

In another example, when a user performs a gesture, the user may indicate to the apparatus though an input means they type of gesture performed. The gesture recognizer 1040 may then map the intensity of the first, second, and/or third channels received to the gesture so that same subsequent gestures are recognized.

Although described with limited examples, various technical modifications and changes may be applicable based on the descriptions provided above.

The artificial neural network 1030 may input the features extracted by the feature extractor 1020 to the input layer of the artificial neural network 1030 as training data, and learn the weighting between the features and the preset gesture through machine learning.

The artificial neural network 1030 may be trained through matching between the gesture recognized by the gesture recognizer 1040 and the features extracted by the feature extractor 1020.

The apparatuses, units, modules, devices, and other components illustrated in FIGS. 1, 2, and 10 that perform the operations described herein with respect to FIG. 9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The image display apparatus described herein may be implemented using a liquid crystal display (LCD), a light-emitting diode (LED) display, a plasma display panel (PDP), a screen, a terminal, or any other type of display known to one of ordinary skill in the art. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A gesture classification apparatus, comprising:
   at least one processor, the processor comprising instructions for executing:
   a feature extractor configured to extract a plurality of features using an electromyogram (EMG) data group obtained from an EMG signal sensor comprising a plurality of channels, and generate an EMG data map of a dimension corresponding to the number of the channels, wherein the EMG data map indicates a distribution of features for each gesture;
   an artificial neural network comprising an input layer to which the EMG data group corresponding to the plurality of features is input, and an output layer configured to output a preset gesture corresponding to the plurality of features; and
   a gesture recognizer configured to recognize a gesture performed by a user and corresponding to the extracted features using the artificial neural network,
   wherein the plurality of features is extracted by moving, on a time axis, a preset-sized window of an EMG signal output from the EMG signal sensor.

2. The apparatus of claim 1, further comprising:
   a preprocessor configured to remove noise from data obtained from the EMG signal sensor and perform normalization on the data having the noise removed.

3. The apparatus of claim 2, wherein the preprocessor is configured to additionally remove a floor value of each channel from data obtained from each channel.

4. The apparatus of claim 2, wherein the preprocessor is configured to extract the EMG data group based on a location of a channel having a maximum value among the plurality of channels.

5. The apparatus of claim 1, wherein the feature extractor is configured to extract a preset number of features from the EMG data map and calculating a performance based on a ratio between a within-cluster variance of each gesture and a between-cluster variance associated with another gesture.

6. The apparatus of claim 1, wherein the artificial neural network includes:
   a first hidden layer disposed between the input layer and the output layer, and
   wherein the first hidden layer is mapped to the input layer in the EMG data group.

7. The apparatus of claim 6, wherein the artificial neural network includes:
   a second hidden layer disposed between the first hidden layer and the output layer, and
   wherein the number of nodes included in the second hidden layer is greater than the number of nodes included in the output layer, and is less than the number of nodes included in the first hidden layer.

8. The apparatus of claim 1, wherein the artificial neural network is trained through general learning based on an EMG data group obtained from the EMG signal sensor sensing gestures performed by a plurality of users, and is trained through adaptive learning based on an EMG data group obtained from the EMG signal sensor sensing the gesture performed by the user.

9. A gesture classification method, comprising:
   obtaining an electromyogram (EMG) data group from a plurality of channels;
   extracting a plurality of features using the EMG data group by generating an EMG data map of a dimension corresponding to the number of channels, wherein the EMG data map indicates a distribution of features for each gesture; and
   recognizing, using an artificial neural network, a gesture performed by a user and corresponding to the extracted features,
   wherein the plurality of features is extracted by moving, on a time axis, a preset-sized window of an EMG signal output from the EMG signal sensor.

10. The method of claim 9, wherein the extracting of the plurality of features includes:
    calculating a performance based on a ratio between a within-cluster variance of each gesture and a between-cluster variance associated with another gesture; and
    extracting a preset number of features based on the calculated performance.

11. The method of claim 9, wherein the artificial neural network includes an input layer to which the EMG data group corresponding to the plurality of features is input, and an output layer configured to output a preset gesture corresponding to the plurality of features.

12. The method of claim 11, wherein the artificial neural network includes:
    a first hidden layer disposed between the input layer and the output layer, and
    wherein the first hidden layer is mapped to the input layer in the EMG data group.

13. The method of claim 12, wherein the artificial neural network includes a second hidden layer disposed between the first hidden layer and the output layer, and
    wherein the number of nodes included in the second hidden layer is greater than the number of nodes included in the output layer, and is less than the number of nodes included in the first hidden layer.

14. The method of claim 9, wherein the artificial neural network is trained through general learning based on an EMG data group obtained from an EMG signal sensor sensing gestures performed by a plurality of users, and is trained through adaptive learning based on an EMG data group obtained from the EMG signal sensor sensing a gesture performed by a corresponding user.

15. A non-transitory computer-readable storage medium storing instructions to cause a processor to perform the method of claim 9.

16. A wearable device comprising:
a sensor configured to obtain an input electromyogram (EMG) signal from a body portion of a user being in contact with the sensor through a plurality of channels; and
a processor configured to extract a plurality of features by moving, on a time axis, a preset-sized window of the input EMG signal, generating an EMG data map of a dimension corresponding to the number of the channels, recognize a gesture performed by a user and corresponding to the plurality of features using an artificial neural network, and perform a command corresponding to the recognized gesture, wherein the EMG data map indicates a distribution of features for each gesture,
wherein the plurality of features is extracted by moving, on a time axis, a preset-sized window of an EMG signal output from the EMG signal sensor.

17. The wearable device of claim 16, wherein the processor is configured to adjust, based on a user feature using the input EMG signal obtained from the user, reference EMG signals of a plurality of users that are pre-trained through the artificial neural network.

18. The wearable device of claim 17, wherein the artificial neural network includes an input layer to which an EMG data group corresponding to the plurality of features is input, and an output layer configured to output a preset gesture corresponding to the plurality of features.

* * * * *